(12) United States Patent
Ziraldo et al.

(10) Patent No.: US 12,709,348 B2
(45) Date of Patent: Aug. 18, 2026

(54) FOOT PEG AND KICK STAND UNIT FOR CONVERTIBLE COMPACT ELECTRIC TRANSPORT DEVICE

(71) Applicant: Honda Motor Co., Ltd., Tokyo (JP)

(72) Inventors: Nicholas P Ziraldo, Powell, OH (US); Matthew B Staal, Torrance, CA (US); Jackie P. Porchay, Torrance, CA (US); Ming Hsein Lee, Taichung (TW); Ding Jong Chou, Taichung (TW); Sheng Yu Huang, Taichung (TW)

(73) Assignees: Honda Motor Co., Ltd., Tokyo (JP); JD Components Co., Ltd., Taichung City (TW)

( * ) Notice: Subject to any disclaimer, the term of this patent is extended or adjusted under 35 U.S.C. 154(b) by 316 days.

(21) Appl. No.: 18/240,871

(22) Filed: Aug. 31, 2023

(65) Prior Publication Data

US 2025/0074527 A1 Mar. 6, 2025

(51) Int. Cl.
*B62J 25/06* (2020.01)
*B62H 1/02* (2006.01)

(52) U.S. Cl.
CPC ................ *B62J 25/06* (2020.02); *B62H 1/02* (2013.01)

(58) Field of Classification Search
CPC .................................. B62H 1/02; B62J 25/06
See application file for complete search history.

(56) References Cited

U.S. PATENT DOCUMENTS

| | | | | |
|---|---|---|---|---|
| 2,285,313 | A * | 6/1942 | Tagliaboschi | B62H 1/02 280/303 |
| 3,384,389 | A | 5/1968 | Polley, Jr. | |
| 3,794,353 | A * | 2/1974 | Oliver | B62J 25/06 74/564 |
| 6,129,370 | A * | 10/2000 | Hsieh | B62J 25/06 74/564 |
| 6,237,929 | B1 | 5/2001 | Kielland | |
| 6,663,129 | B1 * | 12/2003 | Smith | B62J 25/06 74/564 |
| 8,403,351 | B2 | 3/2013 | Cheng | |
| 9,731,785 | B1 * | 8/2017 | Liu | B62J 25/06 |
| 9,862,438 | B2 | 1/2018 | Lin | |
| 11,807,330 | B2 * | 11/2023 | Bank | B62K 11/04 |
| 11,858,578 | B2 * | 1/2024 | Huang | B62J 25/00 |
| 12,275,482 | B1 * | 4/2025 | Staal | B62J 25/04 |
| 2010/0201099 | A1 | 8/2010 | Teng | |

(Continued)

FOREIGN PATENT DOCUMENTS

| | | |
|---|---|---|
| CN | 205417915 U | 8/2016 |
| CN | 205554492 U | 9/2016 |

(Continued)

*Primary Examiner* — Minnah L Seoh
*Assistant Examiner* — Hosam Shabara
(74) *Attorney, Agent, or Firm* — Plumsea Law Group, LLC

(57) ABSTRACT

A mounting bracket for a foldable transport device includes a top portion, a bottom portion, a front wall connecting the top portion and the bottom portion, a first foot peg mounted to the mounting bracket by a first pin and moveably connected to the mounting bracket between a stowed configuration and a riding configuration, and a second foot peg mounted to the mounting bracket by a second pin and moveably connected to the mounting bracket between a stowed configuration and a riding configuration.

18 Claims, 7 Drawing Sheets

(56) References Cited

U.S. PATENT DOCUMENTS

| | | | | |
|---|---|---|---|---|
| 2019/0031272 | A1* | 1/2019 | Kojika | B62K 23/08 |
| 2019/0144065 | A1 | 5/2019 | David et al. | |
| 2023/0068636 | A1* | 3/2023 | Matsuzaki | B62J 43/13 |
| 2024/0425137 | A1* | 12/2024 | Kogirima | B62K 11/10 |

FOREIGN PATENT DOCUMENTS

| | | | | | |
|---|---|---|---|---|---|
| CN | 106043555 | A | | 10/2016 | |
| CN | 104691671 | B | | 4/2017 | |
| CN | 106627918 | A | | 5/2017 | |
| JP | H08207856 | A | * | 8/1996 | B62J 25/06 |
| JP | 2010126152 | A | | 6/2010 | |
| JP | 5285396 | B2 | | 9/2013 | |
| KR | 20090001239 | U | | 2/2009 | |

* cited by examiner

FOOT PEG AND KICK STAND UNIT FOR CONVERTIBLE COMPACT ELECTRIC TRANSPORT DEVICE

BACKGROUND

With rising prices of gasoline and automobiles, many people may turn to other more cost-efficient modes of transportation such as, for example, mopeds, bicycles, scooters and, more recently, electric personal transport devices, such as electric scooters. These electric transport devices may be particularly popular for shorter trips in a city environment due to their compact size, ease of use, mobility, and the fact that they may be folded as needed for ease of portability. They may also be useful for covering the first mile or last mile of a trip which is the link between a user's origin or destination and another transportation means, hub or mass transit network.

Accordingly, there is a need in the art for an improved compact electric transport device.

SUMMARY OF THE INVENTION

The present disclosure is directed to electric transport devices that are convertible between a stowed configuration and a riding configuration. Apparatus and techniques described in connection with various embodiments may be used to provide a mounting bracket for foot pegs moveable between the stowed configuration and the riding configuration. In some embodiments, the mounting bracket mounts a kickstand moveable between the stowed configuration and an extended configuration.

In one aspect, the disclosure provides a mounting bracket for a foldable transport device comprises: a top portion; a bottom portion; a front wall connecting the top portion and the bottom portion; a first foot peg mounted to the mounting bracket by a first pin and moveably connected to the mounting bracket between a stowed configuration and a riding configuration; and a second foot peg mounted to the mounting bracket by a second pin and moveably connected to the mounting bracket between a stowed configuration and a riding configuration.

In another aspect, a vehicle comprises: a frame; a mounting bracket connected to the frame; a first foot peg mounted to the mounting bracket by a first pin; a second foot peg mounted to the mounting bracket by a second pin; and a kickstand mounted to the mounting bracket.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

BRIEF DESCRIPTION OF THE DRAWINGS

The disclosure can be better understood with reference to the following drawings and description. The components in the figures are not necessarily to scale, emphasis instead being placed upon illustrating the principles of the disclosure. Moreover, in the figures, like reference numerals designate corresponding parts throughout the different views.

DETAILED DESCRIPTION

Embodiments are described herein with reference to an electric transport device in the form of an electric scooter. As used herein, an electric scooter is a term used mainly to describe a scooter that is electrically powered. For example, this is a type of personal transport device that is gaining ridership in many locations. The principles of example embodiments described herein may be applied to electric scooters or other types of electric transport devices, such as bicycles, unicycles, mopeds, skateboards, kickboards, wheelchairs, personal transporters, or the like.

According to some aspects, an electric transport devices is convertible between a stowed configuration and a riding configuration. That is, an electric transport device according to some aspects may be a foldable transport device. The apparatus and techniques described in connection with example embodiments may be used to provide an electric transport device having a convenient, compact form factor that allows a user to carry it in a primary vehicle, on public transportation, and/or on other forms of transportation to be used for "last-mile" or "first-mile" trips to and from a destination.

Figure 1:
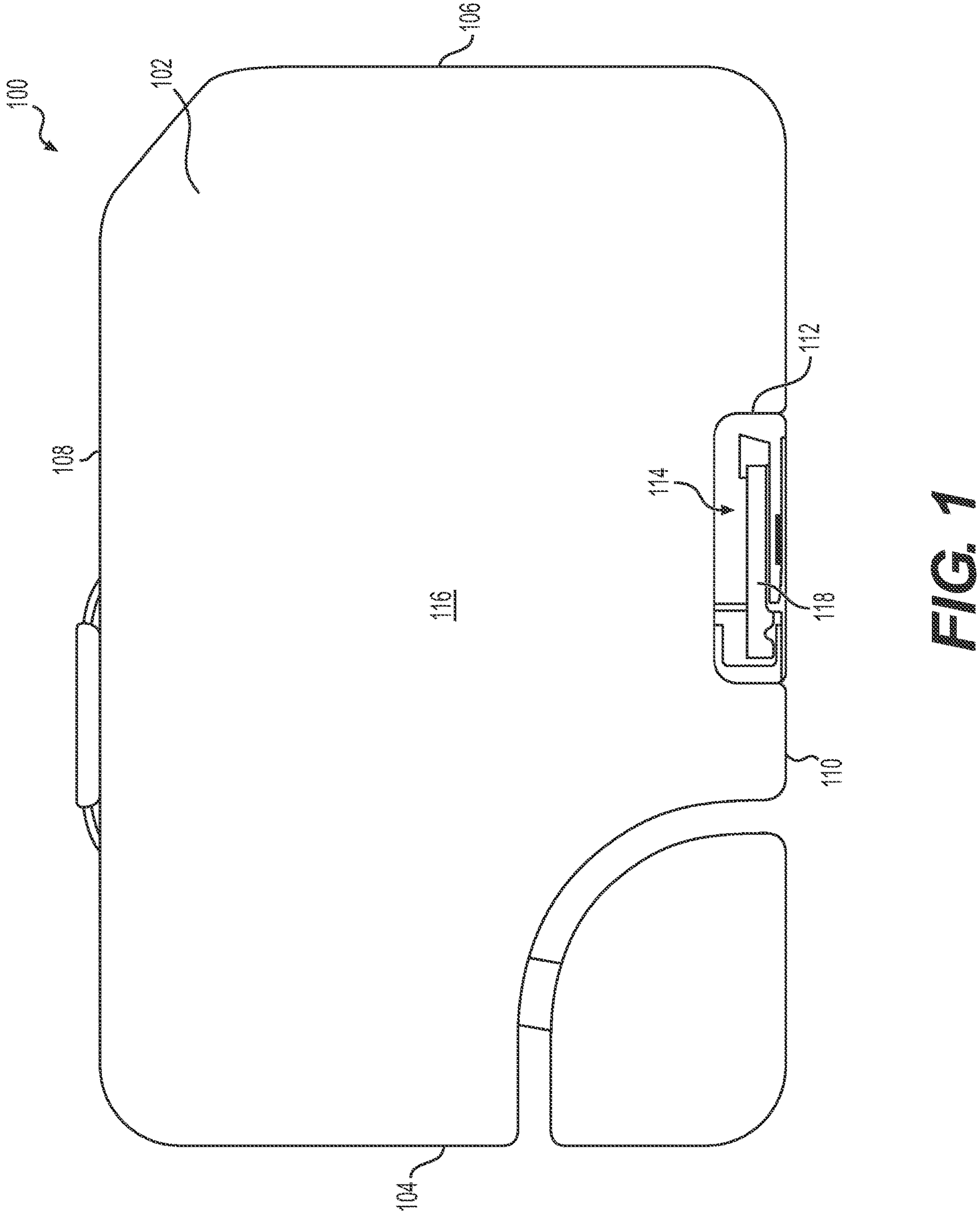
FIG. 1 is a representative view of an exemplary electric transport device in the form of an electric scooter in a stowed configuration in accordance with aspects of the present disclosure.

Referring now to FIG. 1, a representative view of an electric transport device in the form of an electric scooter 100 in a stowed configuration in accordance with aspects of the present disclosure is shown. In some example embodiments, the electric scooter 100 has an outer casing 102 having a generally rectangular shape, including two flat sides having a length that is longer than a height. In addition, the electric scooter of the present embodiments has a width that is substantially smaller than the length and/or height of the electric scooter. In some example embodiments, the electric scooter may be transitioned from a stowed configuration in which components of the electric scooter are stored or disposed inside the outer casing 102 to a riding configuration in which components of the electric scooter are folded or opened from their stored positions to extended positions outside of the outer casing 102 so that the electric scooter may be operated or ridden by a user.

In some embodiments, the electric scooter 100 may be transitioned or converted between a stowed configuration in which components of electric scooter 100 are stored or disposed inside an outer casing 102 to a riding configuration in which components of electric scooter 100 are folded or opened from their stored positions to extended positions outside of outer casing 102 so that electric scooter 100 may be operated or ridden by a user. As shown in FIG. 1, electric scooter 100 is in the stowed configuration. In an example embodiment, the outer casing 102 of the electric scooter 100 may be made of an impact resistant plastic or polymer. It should be understood that other materials may alternatively or additionally be used.

The outer casing 102 of electric scooter 100 extends between a front edge 104 and an opposite rear edge 106, as well as a top edge 108 and an opposite first bottom edge 110. The front edge 104, rear edge 106, top edge 108, and first bottom edge 110 are substantially straight and define an outer perimeter of the rectangular shape of the outer casing 102 of electric scooter 100. The first bottom edge 110 includes a first opening 112 exposing a recess 114. The recess 114 accommodates a first foot peg 118 when the first foot peg 118 is in the stowed configuration.

Figure 2:
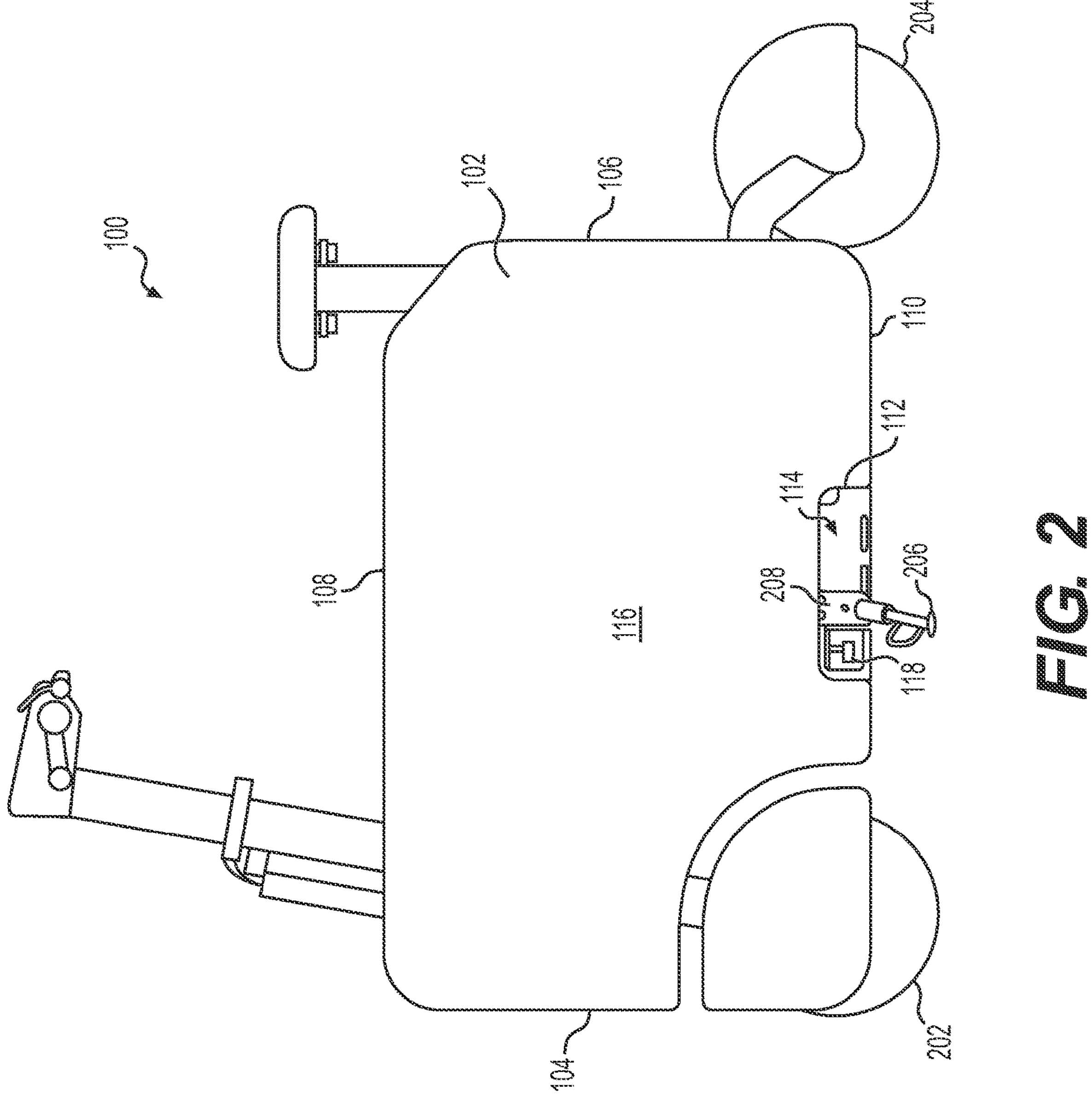
FIG. 2 is a representative view of an electric transport device in the form of an electric scooter in a riding configuration in accordance with aspects of the present disclosure.

Referring now to FIG. 2, a representative view of an electric transport device in the form of the electric scooter 100 in a riding configuration in accordance with aspects of the present disclosure is shown. In the riding configuration components of the electric scooter 100 are opened from stowed positions to extended positions outside of the outer casing 102 so that the electric scooter 100 may be operated or ridden by a user.

In one embodiment, a battery (not shown) provides an electrical charge to a power source, such as a motor, that drives one or more wheels of electric scooter 100, including front wheel 202 and/or rear wheel 204. For example, in one embodiment, an electric motor may be integrated into front wheel 202 of electric scooter 100 (e.g., in the hub of front wheel 202). In such embodiments, battery may provide electricity to power the electric motor in front wheel 202.

In some embodiments, the electric scooter 100 may include provisions to maintain a substantially upright position. For example, as shown in FIG. 2, a kickstand 206 includes a mounting portion 208, where the mounting portion 208 is fixedly mounted to the electric scooter 100. The kickstand 206 has a stowed configuration and an extended configuration. FIG. 2 illustrates the extended configuration, wherein the kickstand 206 extends downward from the mounting portion 208 in the recess 114 at an angle towards the ground surface.

In addition, in some embodiments, the kickstand 206 is configured to fold outwards from the first bottom edge 110 of the electric scooter 100. For example, as shown in FIG. 2, the kickstand 206 may be extended downwards towards the ground surface. With this arrangement, the kickstand 206, in conjunction with the front wheel 202 and the rear wheel 204, allows the electric scooter 100 to remain in an upright position on the ground surface when the user is not riding the electric scooter 100 and it is parked. Additionally, the kickstand 206 keeps the electric scooter 100 from resting on the ground surface along its side surfaces, thereby preventing scrapes, scuffing, and/or damage to the electric scooter 100.

In some embodiments, the kickstand 206 may be deployed while the first foot peg 118 is in the stowed configuration. In some embodiments, the kickstand 206 may be deployed while the first foot peg 118 is in the riding configuration.

Figure 3:
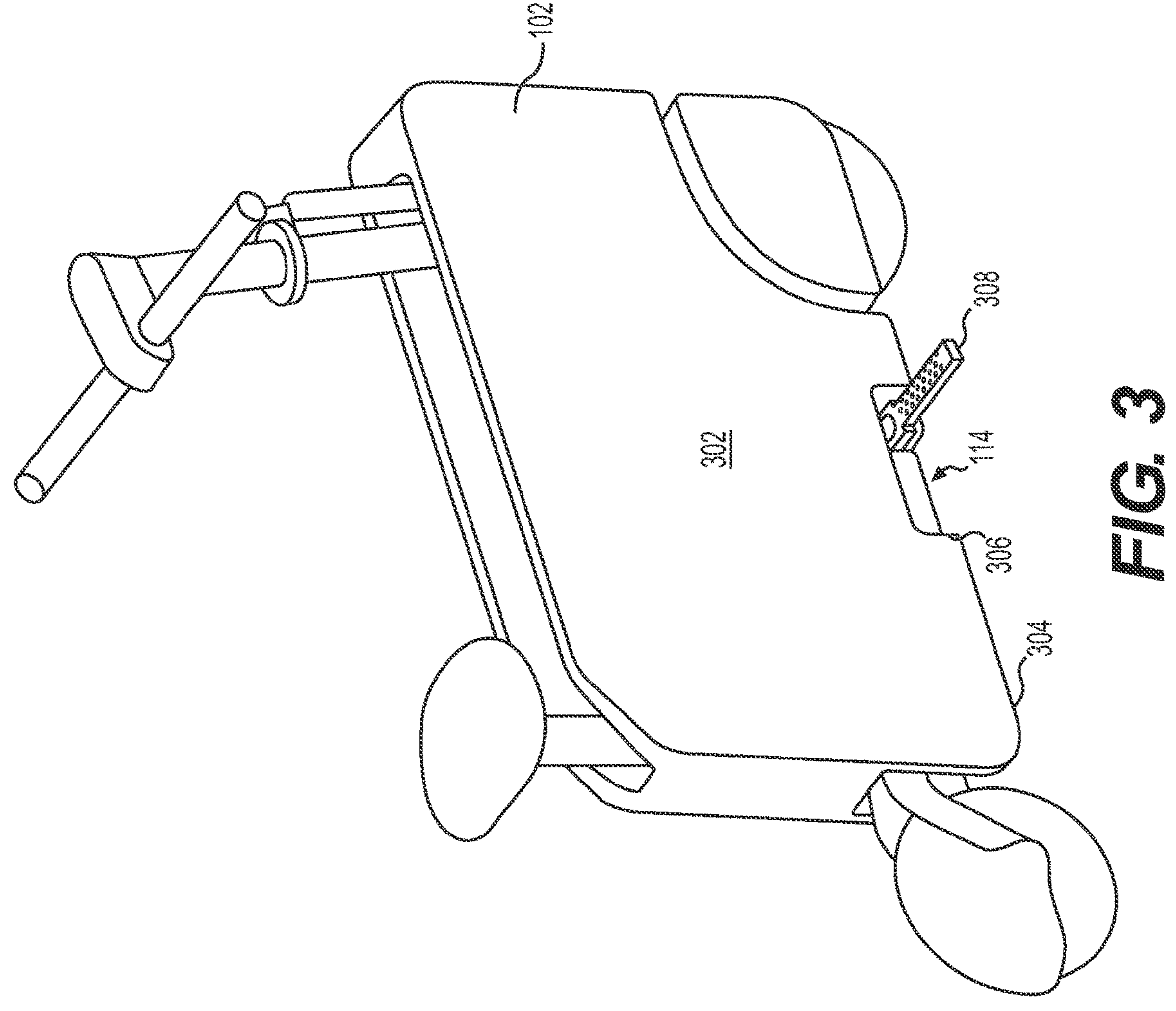
FIG. 3 is an isometric view of one side of an electric transport device in the form of an electric scooter of in a riding configuration in accordance with aspects of the present disclosure.

Referring now to FIG. 3, the outer casing 102 includes a first side surface 116 (shown in FIG. 1 and FIG. 2) and an opposite second side surface 302. The second side surface 302 has a second bottom edge 304 including a second opening 306 exposing the recess 114. The recess 114 accommodates a second foot peg 308 when the second foot peg 308 is in the stowed configuration. It should be understood that, while the kickstand 206 is illustrated in a configuration adapted to a deployment from the first side surface 116, this is a non-limiting example and a kickstand may be configured to deploy from the second side surface 302.

Figure 4:
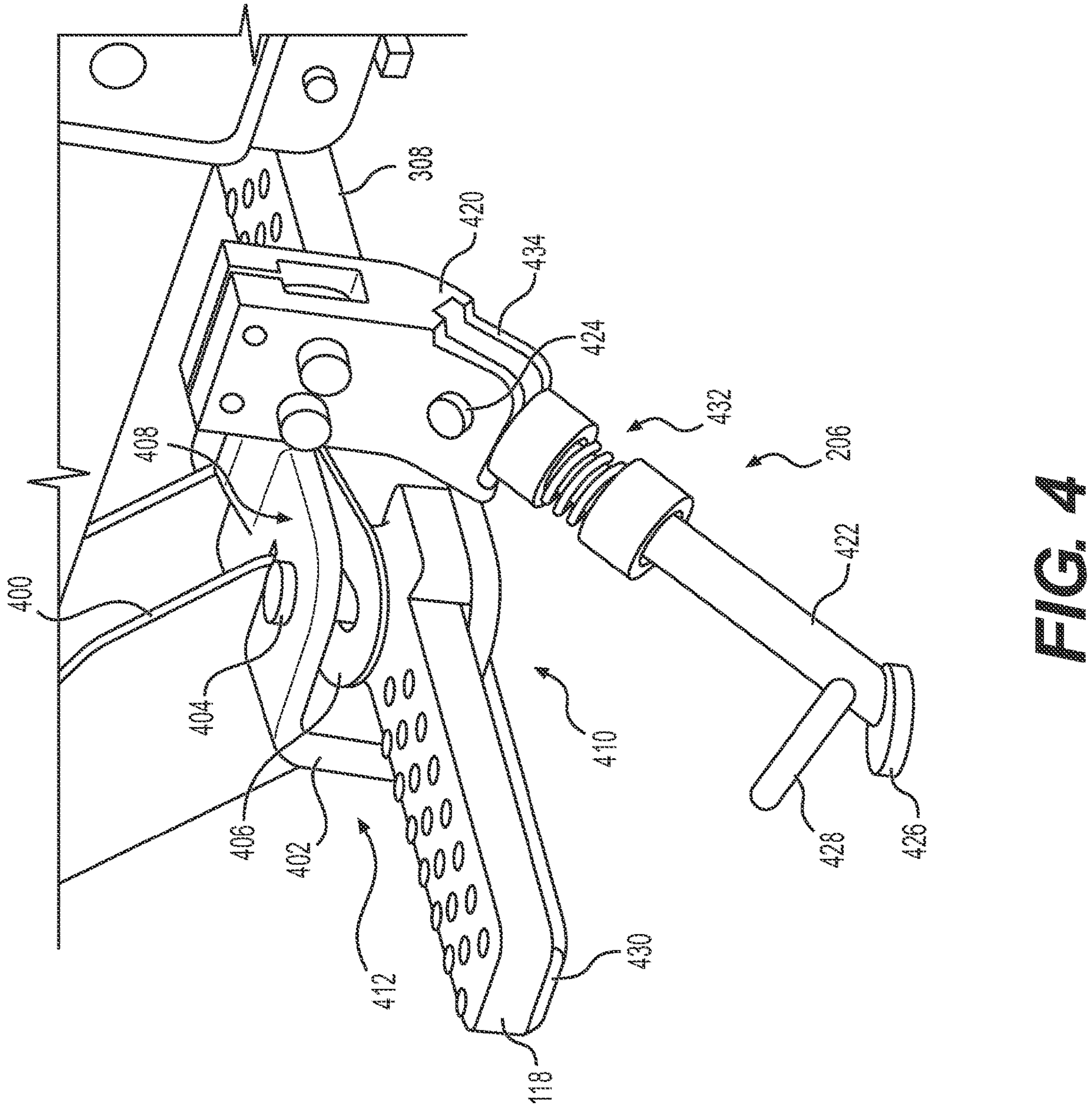
FIG. 4 is a representative view of one embodiment of foot pegs and a kickstand in a riding configuration in accordance with aspects of the present disclosure.

In some embodiments, the electric scooter 100 may also include provisions to receive the feet of a user while the user is riding the electric scooter 100 in the riding configuration. For example, as shown in FIG. 4, a mounting bracket 402 is connected to a frame 400 of the electric scooter 100, and the mounting bracket 402 supports the first foot peg 118 and the second foot peg 308.

The mounting bracket 402 may include a top portion 408, a bottom portion 410, and a front wall 412 connecting the top portion 408 and the bottom portion 410. The mounting bracket 402 may be generally C-shaped, with an opening toward a rear of the electric scooter 100, allowing the foot pegs to be folded backward from the riding configuration into the stowed configuration.

In some aspects, each of the foot pegs may be secured to the mounting bracket 402 by a pin passing from the top portion 408 to the bottom portion 410. For example, the first foot peg 118 is secured to the mounting bracket 402 by a first pin 404, and the first pin 404 passes through the top portion 408 of the mounting bracket 402, the first foot peg 118, and the bottom portion 410 of the mounting bracket 402. The pin functions as a fulcrum around which the foot peg may pivot between the stowed configuration and the riding configuration.

In one example, the first pin 404 may be threaded into the bottom portion of the mounting bracket 402. In another example, the first pin 404 may pass through the bottom portion of the mounting bracket 402 and be retained by a retaining member, such as a cotter pin, c-clip, or a nut. In a configuration including a cotter pin, the first pin 404 may be a clevis pin.

Figure 5:
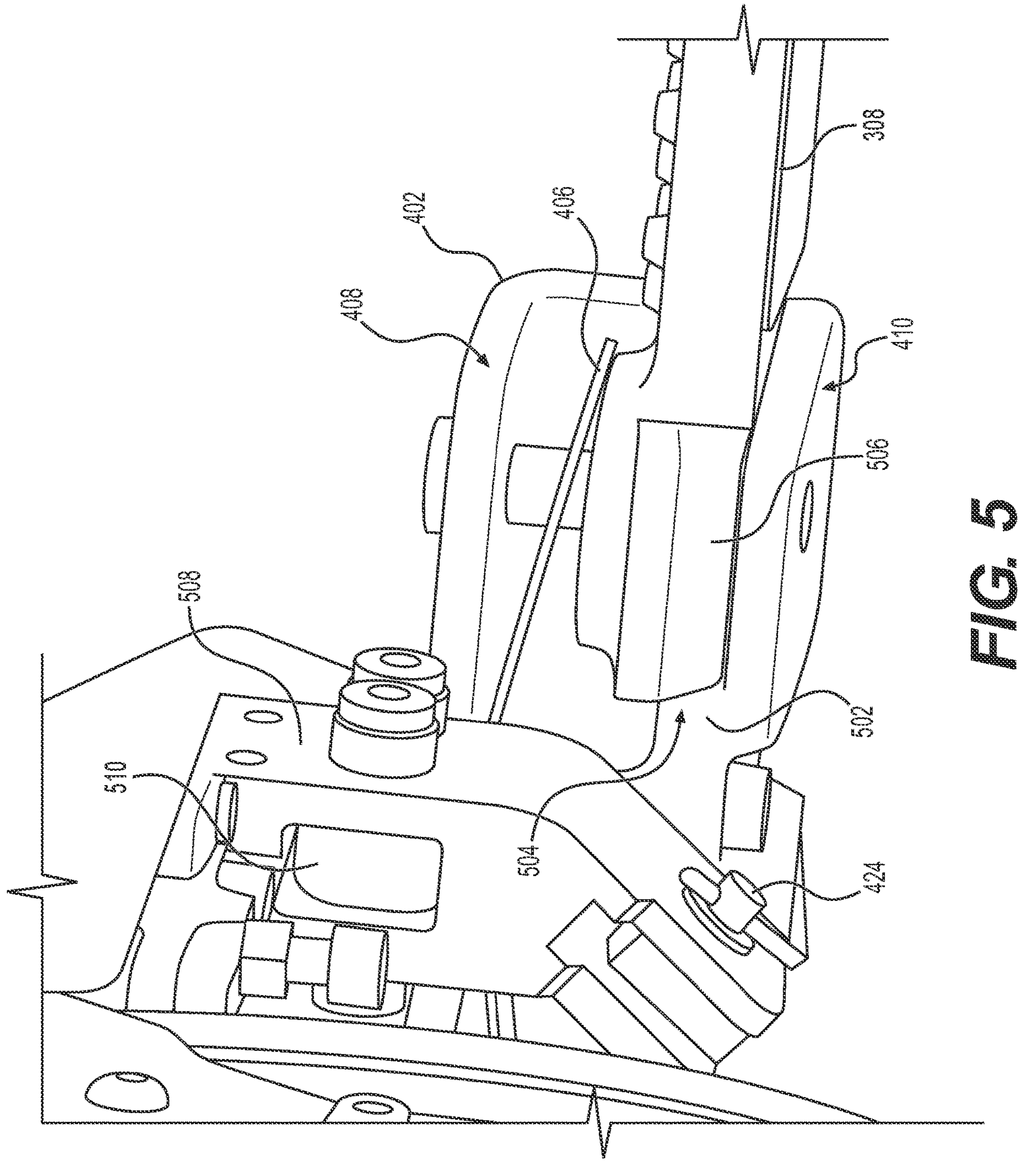
FIG. 5 is a representative view of foot pegs and a mounting bracket of FIG. 4 in accordance with aspects of the present disclosure.

In some embodiments, a first resilient member 406 provides a force engaging the first foot peg 118 with the bottom portion of the mounting bracket 402. The force may resiliently hold the first foot peg 118 in the stowed configuration or the riding configuration. In some embodiments, the first resilient member 406 spans the mounting bracket 402 and also provides a force on the second foot peg 308, as shown in FIG. 5. In some aspects, the first resilient member 406 has a generally curved shape, with end portion contact the foot pegs and a central portion contacting the top portion of the mounting bracket 402.

By way of example, the bottom portion 410 of the mounting bracket 402 includes an upward angled face 502 and the second foot peg 308 includes a first downward angled face 504 and a second downward angled face 506. In the riding configuration, the upward angled face 502 of the mounting bracket 402 and the first downward angled face 504 of the second foot peg 308 are held in place against one another by the force applied by the resilient member 406. In the stowed confirmation, the upward angled face 502 of the mounting bracket 402 and the second downward angled face 506 of the second foot peg 308 are held in place against one another by the force applied by the resilient member 406. That is, to change between the configurations, the rider needs to manipulate each foot peg and overcome the force applied by the resilient member 406 so that a downward angled face of the foot peg slides up the upward angled face 502 of the mounting bracket 402 and the pin while rotating about the pin. Thus, the foot peg may be changed between the stowed configuration and the riding configuration.

The foot pegs may be positioned at opposite ends of the mounting bracket 402, and are configured to pivot outward (e.g., 90 degrees) from a folded position inside the electric scooter 100 in the stowed configuration to an extended position approximately perpendicular to the first side surface 116 and the second side surface 302 of the outer casing 102 of the electric scooter 100 in the riding configuration. With this arrangement, the foot pegs may be provided to allow a user to rest their feet while riding the electric scooter 100.

According to some aspects, the foot pegs may each have a curved bottom surface 430. A curve of the bottom surface 430 has a shape configured to be held by a human hand, for example, when carrying the electric scooter 100 under an arm. In some embodiments, the bottom surface 430 is an integral to the foot peg. In other embodiments, the bottom surface 430 is formed of a material different than the foot peg and is bonded or connected to the foot peg. In some examples, the bottom surface 430 may be formed of a rubber material.

Referring now to FIG. 4 and FIG. 5, in a process of transitioning or converting the electric scooter 100 from the stowed configuration to the riding configuration the foot pegs are folded out from the recess 114 in the first side surface 116 of the electric scooter 100 near the first bottom edge 110. As described above, the foot pegs may be disposed at one end of the mounting bracket 402 that is fixedly attached inside the outer casing 102 of the electric scooter 100.

As shown in FIG. 4 and FIG. 5, the foot pegs are configured to pivot outward (e.g., 90 degrees) from a folded position inside the recess 114 of the electric scooter 100 in the stowed configuration to an extended position approximately perpendicular to the first side surface 116 of the outer casing 102 of the electric scooter 100 in the riding configuration. Additionally, the foot pegs similarly extend out from the second side surface 302 opposite the first side surface 116 of the electric scooter 100 so that a user may place their feet on foot pegs on both sides of the electric scooter 100. With this arrangement, the foot pegs may be provided to allow a user to rest their feet above the ground surface while riding the electric scooter 100.

Referring again to the kickstand 206 and FIG. 4 and FIG. 5, in one embodiment the kickstand 206 includes a kickstand mount 420, a kickstand leg 422, and a pivot 424 connecting the kickstand leg 422 to the kickstand mount 420. The kickstand 206 may further include a foot 426 at a distal end of the kickstand leg 422, and a projection 428 of the kickstand leg 422.

In one aspect, the kickstand mount 420 includes a clamp 508 connecting the kickstand 206 to an extension 510 of the mounting bracket 402. In some examples, the extension 510 extends backwards from the top portion of the mounting bracket and is configured to receive the kickstand mount 420.

In some examples, the kickstand mount 420 may have an upper portion and a lower portion. The upper portion may include the clamp 508. The upper portion has a generally vertical orientation, extending downward from the extension 510 of the mounting bracket 402. The lower portion may include the pivot 424. According to some aspects, the kickstand mount 420 has an angle between the upper portion and the lower portion, wherein the lower portion has a generally angled orientation, wherein in the extended orientation, the kickstand leg 422 extends to the ground surface at an angle from the vertical orientation of the upper portion.

According to some embodiments, the connection between the kickstand 206 and the mounting bracket 402 may be at or near a centerline of the mounting bracket 402. The location at or near the centerline enables the kickstand 206 and the foot pegs to be manipulated independently of one another. That is, the kickstand 206 may be deployed while the foot pegs are in the stowed configuration or the riding configuration. Similarly, the foot pegs may be moved between the stowed configuration and the riding configuration while the kickstand 206 is in the stowed configuration or the extended configuration.

To convert the kickstand 206 from the stowed configuration and the extended configuration, the rider may press the projection 428 downward by stepping on the projection 428. That is, the projection 428 may extend from the recess 114, such that the rider may step on the projection 428 and convert the kickstand 206 to the extended configuration.

In both the stowed configuration and the extended configuration, a tensioning device 432 pushes against a cam surface 434 of the kickstand mount 420. For example, the tensioning device 432 may include a fixed portion, a compression spring, and a sliding portion. The compression spring forces the sliding portion away from the fixed portion and into contact with the cam surface 434. The cam surface 434 may have two flat portions connected by an angled portion, such that an angle formed by the flat portions is greater than 270 degrees. According to some aspects, the angle greater than 270 degrees helps to prevent an unintentional change in the configuration of the kickstand 206. In changing between the stowed configuration and the extended configuration, the tensioning device 432 is pushed by the rider, where the sliding portion of the tensioning device 432 is deflected towards the fixed portion by the angled portion of the cam surface 434.

Figure 6:
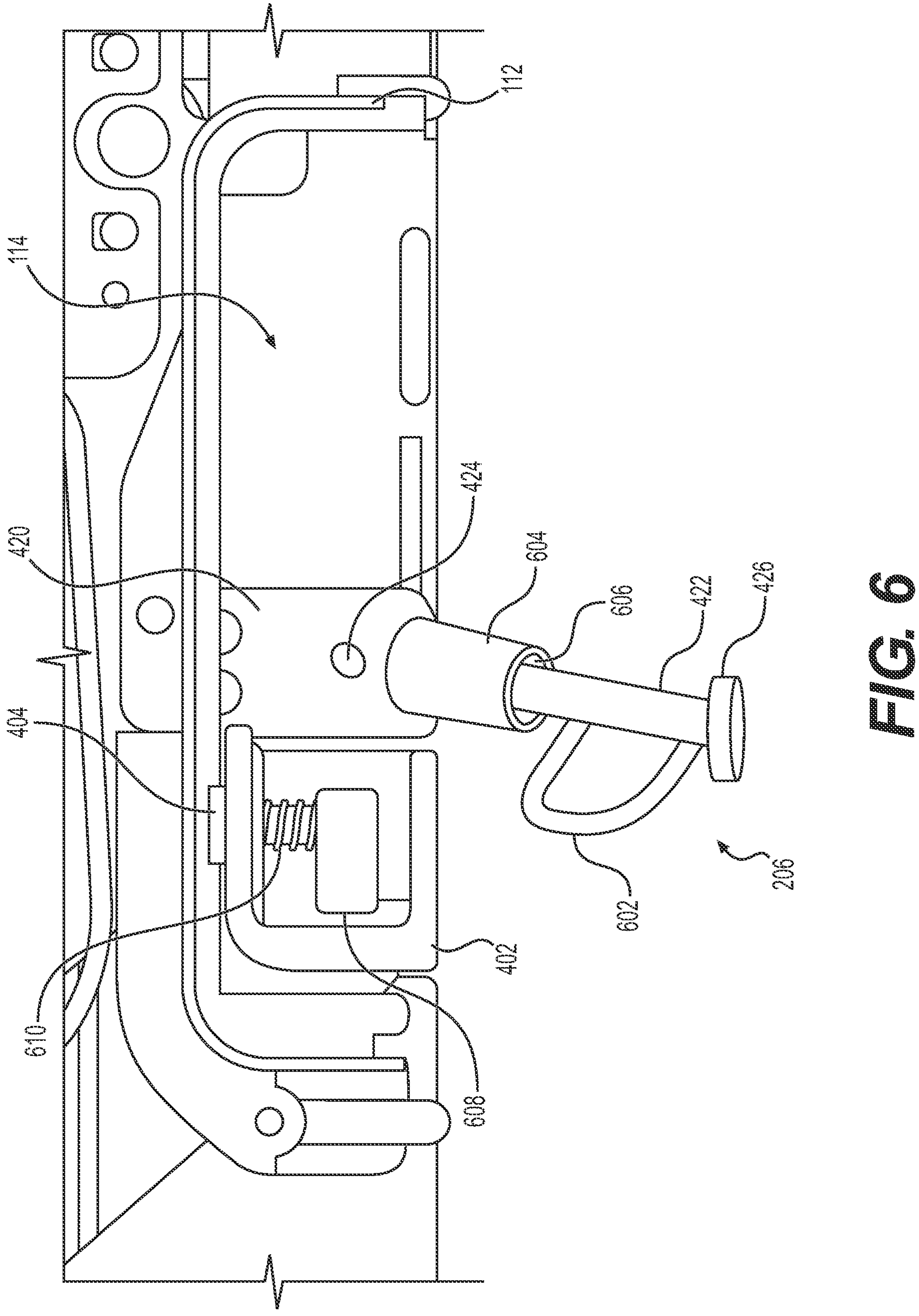
FIG. 6 is a representative view of another embodiment of a foot peg and a kickstand in a riding configuration in accordance with aspects of the present disclosure.
Figure 7:
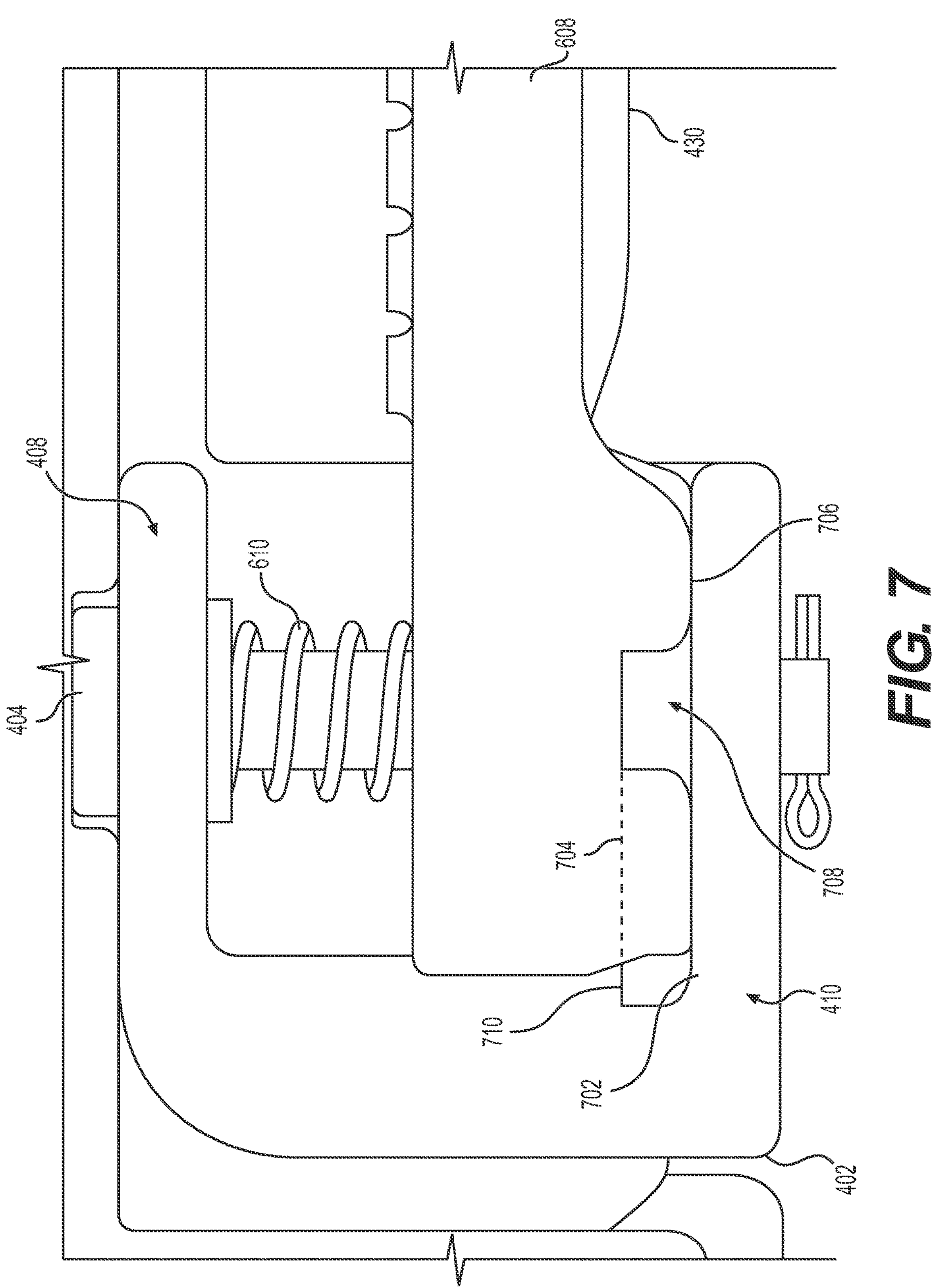
FIG. 7 is a representative view of a foot peg of FIG. 6 being in a stowed configuration in accordance with aspects of the present disclosure.

Referring to FIG. 6 and FIG. 7, in another other embodiment the kickstand 206 may include the kickstand mount 420, the kickstand leg 422, the pivot 424 connecting the kickstand leg 422 to the kickstand mount 420, the foot 426 at a distal end of the kickstand leg 422, and a loop projection 602 of the kickstand leg 422.

The loop projection 602 may be used to convert the kickstand 206 from the stowed configuration and the extended configuration, where the rider may press the loop projection 602 downward by stepping on the loop projection 602. In some aspects, the loop projection 602 forms a loop with the kickstand leg 422 and is configured to accept a lock (not shown), which may be used to secure the electric scooter 100.

In both the stowed configuration and the extended configuration, a sliding tensioning device 604 pushes against a cam surface of the kickstand mount 420. The sliding tensioning device 604 may include an internal compression spring (not illustrated in FIG. 6) fitted around the kickstand leg 422 and within the sliding tensioning device 604. The kickstand leg 422 may include seat members 606, upon which the compression spring may sit. The compression spring applies a force to the sliding tensioning device 604, away from the seat members 606 and toward the cam surface. In changing between the stowed configuration and the extended configuration, the sliding tensioning device 604 is deflected by the angled portion of the cam surface.

According to some embodiments, each of the foot pegs may be secured to the mounting bracket 402 by a pin. For example, a foot peg 608 is secured to the mounting bracket 402 by the pin 404. The pin 404 passes through a hole in a top portion of the mounting bracket 402, the foot peg 608, and a bottom portion of the mounting bracket 402, thereby forming a fulcrum around which the foot peg may pivot between the stowed configuration and the riding configuration.

In some embodiments, a resilient member 610 provides a force engaging the foot peg 608 with a top surface 702 of the bottom portion 410 of the mounting bracket 402. The force may resiliently hold the foot peg 608 in the stowed configuration or the riding configuration. In some embodiments, the resilient member 610 is a compression spring. In some aspects, the foot peg 608 includes one or more detents in a bottom surface 706 contacting the bottom portion of the mounting bracket 402. The mounting bracket 402 may include a projection, onto which the detents may fit and secure the foot peg in one or the other configuration. For example, as shown in FIG. 7, the foot peg 608 includes a first detent 708 and a second detent (not shown). As illustrated in the FIG. 7, the second detent 704 is engaged with a projection 710 of the mounting bracket 402. That is, in a stowed configuration, the second detent 704 is engaged with the projection 710, and in the riding configuration the first detent 708 is engaged with the projection 710. Stated another way, the detents are selectively engaged based on the configuration of the foot peg.

While various embodiments of the disclosure have been described, the description is intended to be exemplary, rather than limiting and it will be apparent to those of ordinary skill in the art that many more embodiments and implementations are possible that are within the scope of the disclosure. Accordingly, the disclosure is not to be restricted except in light of the attached claims and their equivalents. Also, various modifications and changes may be made within the scope of the attached claims.

We claim:

1. A foot peg unit for a foldable transport device comprising:

a mounting bracket including a top portion, a bottom portion, and a front wall connecting the top portion and the bottom portion;

a first foot peg mounted to the mounting bracket by a first pin and moveably connected to the mounting bracket between a stowed configuration and a riding configuration;

a second foot peg mounted to the mounting bracket by a second pin and moveably connected to the mounting bracket between a stowed configuration and a riding configuration; and an extension of the mounting bracket from the top portion and at a centerline of the mounting bracket between the first pin and the second pin and configured to receive a kickstand mount.

2. A foot peg unit for a foldable transport device comprising:

a mounting bracket including a top portion, a bottom portion, and a front wall connecting the top portion and the bottom portion;

a first foot peg mounted to the mounting bracket by a first pin and moveably connected to the mounting bracket between a stowed configuration and a riding configuration;

a second foot peg mounted to the mounting bracket by a second pin and moveably connected to the mounting bracket between a stowed configuration and a riding configuration; and at least one resilient member between the top portion of the mounting bracket and the first foot peg and the second foot peg, the at least one resilient member applying a force onto the first foot peg and the second foot peg, respectively.

3. The foot peg unit of claim 2, wherein the first pin passes through the top portion, the first foot peg, and the bottom portion, and the second pin passes through the top portion, the second foot peg, and the bottom portion.

4. The foot peg unit of claim 2, wherein the at least one resilient member includes a single resilient member that spans between the first foot peg and the second foot peg and contacts the top portion of the mounting bracket.

5. The foot peg unit of claim 2, wherein the at least one resilient member includes:

a first resilient member between the top portion of the mounting bracket and the first foot peg; and a second resilient member between the top portion of the mounting bracket and the second foot peg.

6. The foot peg unit of claim 2, further comprising an upward angled face extending from the bottom portion of the mounting bracket, wherein the first foot peg comprises a first downward angled face and a second downward angled face, wherein in the stowed configuration the first downward angled face of the first foot peg is held against the upward angled face by the at least one resilient member, and in the riding configuration the second downward angled face of the first foot peg is held against the upward angled face by the at least one resilient member.

7. The foot peg unit of claim 2, further comprising a projection extending upward from the bottom portion of the mounting bracket, wherein the first foot peg comprises a first detent and a second detent, wherein in the stowed configuration the first detent of the first foot peg is held against the projection by the at least one resilient member, and in the riding configuration the second detent of the first foot peg is held against the projection by the at least one resilient member.

8. A vehicle comprising:

a frame;

a mounting bracket connected to the frame;

a first foot peg mounted to the mounting bracket by a first pin;

a second foot peg mounted to the mounting bracket by a second pin; and a kickstand mounted to the mounting bracket;

the mounting bracket including an extension at a centerline of the mounting bracket between the first pin and the second pin; and a kickstand mount connected to the extension of the mounting bracket.

9. The vehicle of claim 8, wherein the kickstand further comprises:

a kickstand leg; and a pivot connecting the kickstand leg to the kickstand mount and configured to enable the kickstand leg to have a stowed configuration and an extended configuration relative to the mounting bracket.

10. The vehicle of claim 9, wherein the kickstand mount comprises a cam surface and the kickstand comprises a tensioning device connected to the kickstand leg and including a sliding portion held in tension against the cam surface.

11. The vehicle of claim 8, further comprising:

a kickstand leg moveably connected to the kickstand mount between a stowed configuration and an extended configuration relative to the mounting bracket.

12. The vehicle of claim 8, wherein the mounting bracket comprises:

a top portion; and a bottom portion, wherein the first pin passes through the top portion, the first foot peg, and the bottom portion, and the second pin passes through the top portion, the second foot peg, and the bottom portion.

13. The vehicle of claim 12, further comprising at least one resilient member between the top portion of the mounting bracket and the first foot peg and the second foot peg, the at least one resilient member applying a force onto the first foot peg and the second foot peg.

14. The vehicle of claim 13, wherein the at least one resilient member includes a single resilient member that spans between the first foot peg and the second foot peg and contacts the top portion of the mounting bracket.

15. The vehicle of claim 13, wherein the at least one resilient member includes:

a first resilient member between the top portion of the mounting bracket and the first foot peg; and a second resilient member between the top portion of the mounting bracket and the second foot peg.

16. The vehicle of claim 13, wherein the mounting bracket comprises an upward angled face extending from the bottom portion of the mounting bracket, and the first foot peg comprises a first downward angled face and a second downward angled face, wherein in a stowed configuration the first downward angled face of the first foot peg is held against the upward angled face by the at least one resilient member, and in a riding configuration the second downward angled face of the first foot peg is held against the upward angled face by the at least one resilient member.

17. The vehicle of claim 13, wherein the mounting bracket comprises a projection extending upward from the bottom portion of the mounting bracket, and the first foot peg comprises a first detent and a second detent, wherein in a stowed configuration the first detent of the first foot peg is held against the projection by the at least one resilient member, and in a riding configuration the second detent of the first foot peg is held against the projection by the at least one resilient member.

18. A vehicle comprising:

a frame;

a mounting bracket connected to the frame;

a first foot peg mounted to the mounting bracket by a first pin;

a second foot peg mounted to the mounting bracket by a second pin; and a kickstand mounted to the mounting bracket;

wherein the first foot peg and the second foot peg each include a curved bottom surface that, in a stowed configuration, is exposed by an outer casing of the vehicle.

* * * * *